United States Patent [19]

Sugizaki et al.

[11] 4,168,575

[45] Sep. 25, 1979

[54] CONSTANT PRESSURE MEASURING MICROMETER

[75] Inventors: Iwao Sugizaki; Mineo Yamauchi, both of Kawasaki, Japan

[73] Assignee: Kabushiki Kaisha Mitutoyo Seisakusho, Tokyo, Japan

[21] Appl. No.: 844,207

[22] Filed: Oct. 21, 1977

[30] Foreign Application Priority Data

Oct. 26, 1976 [JP] Japan .......................... 51/143772[U]

[51] Int. Cl.² ............................................... G01B 3/18
[52] U.S. Cl. ..................................... 33/164 R; 33/166
[58] Field of Search ..................... 33/164 R, 165, 166, 33/167, 143 M, 143 R

[56] References Cited

FOREIGN PATENT DOCUMENTS

| | | | |
|---|---|---|---|
| 961552 | 5/1950 | France ............................. | 33/166 |
| 412840 | 2/1946 | Italy .................................. | 33/166 |
| 597656 | 1/1948 | United Kingdom ............ | 33/166 |

*Primary Examiner*—Richard E. Aegerter
*Assistant Examiner*—Willis Little
*Attorney, Agent, or Firm*—Brisebois & Kruger

[57] ABSTRACT

The present invention relates to a micrometer constituted such that an anvil is supported on a frame by means of parallel leaf springs so that the displacement of said anvil may be magnified and transmitted by a sector gear to a pointer; and said leaf spring is urged toward the spindle by another spring.

5 Claims, 5 Drawing Figures

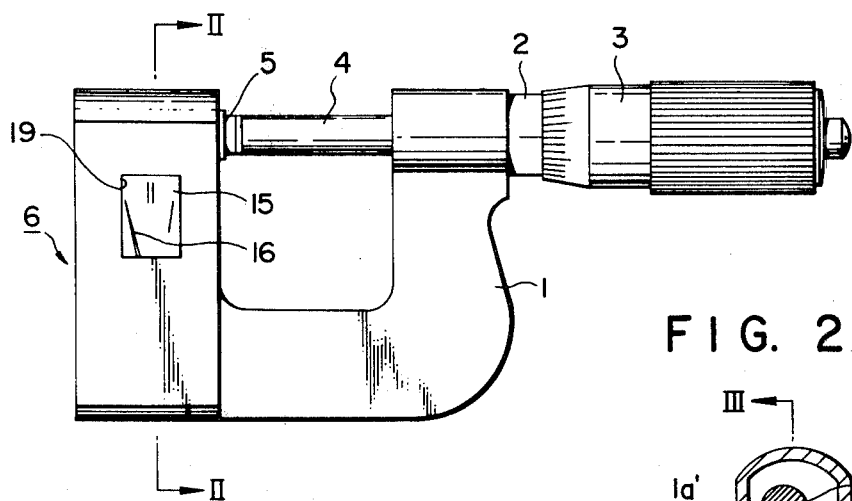
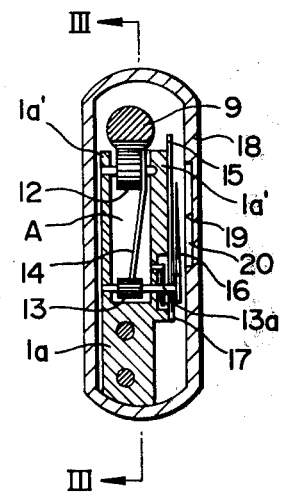
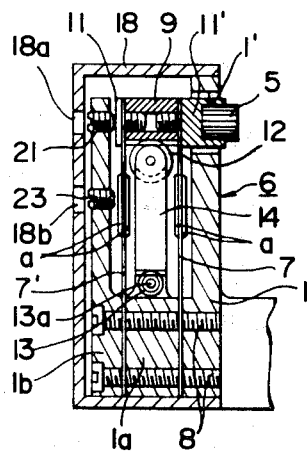
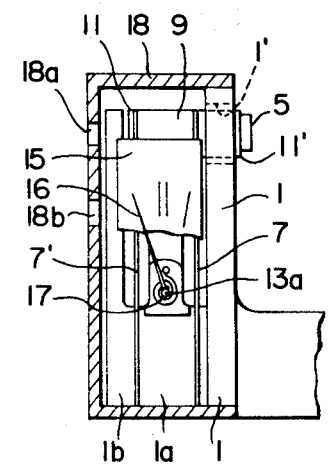
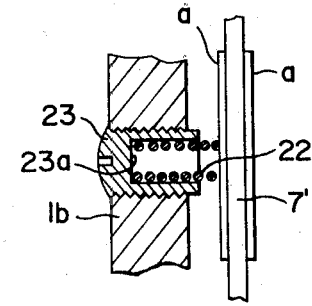

CONSTANT PRESSURE MEASURING MICROMETER

BACKGROUND OF THE INVENTION

The present invention relates to a constant pressure measuring micrometer.

In the prior art there is a constant pressure measuring micrometer as illustrated in the U.S. pat. appln. Ser. No. 492,720 in which the movement of an anvil supported on a pair of parallel leaf springs can be transmitted to a pointer. Such a micrometer, however, has been found unsatisfactory with respect to precision, because the force of the leaf spring in it cannot be adjusted depending on the quality or hardness of an object to be measured.

SUMMARY OF THE INVENTION

The main object of the present invention is to provide a constant pressure measuring micrometer with high precision.

Another object of the present invention is to provide a constant pressure measuring micrometer constituted such that the movement of a pointer is magnified and the anvil is urged toward the spindle.

Still another object of the present invention is to provide a constant pressure measuring micrometer in which the force of the spring urging the anvil toward the spindle is adjustable.

These objects, features and the advantages of the invention will become more apparent upon a reading of the following detailed specification and drawings.

BRIEF DESCRIPTION OF THE DRAWINGS

FIG. 1 is an elevation view of a micrometer according to the present invention.

FIG. 2 is a section view along the line II—II of the micrometer in FIG. 1.

FIG. 3 is a section view along the line III—III of the micrometer in FIG. 2.

FIG. 4 is a partial fragmentary front view of the constant pressure mechanism.

FIG. 5 is an enlarged longitudinal section view and a spring interposed between them.

DETAILED DESCRIPTION OF THE INVENTION

An embodiment of the present invention is to be described referring to the drawings.

FIG. 1 illustrates a constant pressure measuring micrometer as an embodiment of the present invention, wherein 1 is the frame body; 2 is a sleeve; 3 is a thimble; 4 is a spindle; 5 is an anvil; and 6 is a constant pressure mechanism attached to the tip of said frame body 1.

Referring to FIGS. 2 to 5, said constant pressure mechanism is to be described. Between the tip of the frame body 1 and the spacer frame 1a and between said spacer frame 1a and the end frame 1b come the bottoms of two leaf springs 7,7' which have stiffeners a,a on each side of the middle part. Said spacer frame 1a, end frame 1b and leaf springs 7,7' are integrally fitted to the frame body 1 by means of two bolts 8,8. At the top of the spacer frame 1a, as seen from FIG. 2, there are forked portions 1a', 1a' and between these portions there is formed a space A.

Between the top ends of the leaf springs 7', 7 there is provided a cylindrical rack bar 9 with a rack cut at the bottom, both ends of said bar being fixed to the leaf springs 7', 7 with screws 11,11'. Said anvil 5, running through a hole 1' opening at the top of the frame body 1, faces the spindle and is fixed to said screw 11'.

Between the tops and bottoms of the forked portions 1a', 1a' of the spacer frame 1a the pinion 12 and the pointer pinion 13 are respectively pivoted rotatably, said pinion 12, upper-positioned, meshing with the rack of said rack bar 9 and the pointer pinion 13, down-positioned, meshing with the teeth of the sector gear 14 integrated with said pinion 12.

The shaft 13a of the pointer pinion 13 extends forward of the spacer frame 1a; and the pointer 16 is attached to the tip of said shaft 13 in front of the scale plate 15 attached to the front of the spacer frame. Moreover, to said shaft 13 is fitted one end of a coil spring 17, the other end of which is fixed to the frame body 1, so that a backlash in the engagement of said pinion 13 with said sector gear 14 may be eliminated.

The pointer 16 on the scale plate 15 is visible through a window opening 19 (FIG. 1, FIG. 3) in the cover 18 enclosing the constant pressure mechanism 6. Said window 19 is glazed with a transparent sheet 20. As seen from FIG. 3, the end frame 1b is equipped with a stopper screw 21 which prevents the anvil 5 from moving farther than specified, the stop position being set by the screw 21. Meanwhile one end of a spring 22 comes into contact with the side of the stiffener a of the leaf spring 7', while the other end of said spring 22 goes into the recess 23a of an adjusting screw 23 screwed into the end frame 1b, whereby the other end of said spring 22 is supported by said adjusting screw 23. Thus the force of the spring 22, i.e., the pressure working on the leaf spring can be adjusted by the position of the adjusting screw 23, an enlarged view of the area concerned being given in FIG. 5. Said two screws 21,23 are movable through the holes 18a,18b provided on the cover 18.

Such being the constitution of the micrometer according to the present invention, the necessary operation is simply as follows:

Place the anvil 5 and the spindle 4 in line with each other, with the relative position set by the pointer 16 and the scale of the scale plate 15; next hold an object to be measured between the anvil 5 and the spindle 4; and then move the spindle 4 toward the object until the pointer 16 and the scale come to indicate the set position. Thus the measurement can be finished swiftly under a constant pressure. Meanwhile, since the anvil movement is given as a magnified shift of the pointer 16 through the sector gear 14, it is easy to set the pointer 16 against the scale. Moreover, since the anvil 5 is all the time urged by the spring 22 toward the spindle 4, in other words the leaf springs 7,7' are normally inclined, the measurement can be done with the leaf springs in upright position under applied pressure; and accordingly with the anvil set at an accurate position the precision of measurement can be enhanced. Further, adjustability of the force of the spring 22 gives an advantage of the measuring pressure being appropriately set meeting the quality or hardness of the object to be measured.

What is claimed is:

1. Constant pressure measuring micrometer comprising:
    a frame;
    a spindle fitted to one end of said frame for movement along a predetermined path;
    a pair of parallel leaf springs connected to the other end of said frame and extending normal to the path of movement of the spindle for deflection toward and away from the spindle;

an anvil supported on said pair of leaf springs and generally aligned with the path of movement of the spindle;

a rack on said anvil;

a first pinion meshing with said rack and pivoted to said frame;

a sector gear fixed to said first pinion;

a second pinion meshing with said sector gear and pivoted to said frame;

a pointer driven by said second pinion;

spring means for displacing said anvil toward said spindle; and an adjusting screw on said frame for adjusting the force of said spring means to preset the constant pressure at which measurements are made, so that measurements of different parts can be made at different preset pressures by adjusting the adjusting screw.

2. Constant pressure micrometer according to claim 1 wherein said spring means comprises a compression spring extending between said adjusting screw and one of said leaf springs.

3. Constant pressure measuring micrometer of claim 2, wherein said adjusting screw has a recess facing said leaf spring; and one end of the compression spring goes into said recess.

4. Constant pressure measuring micrometer of claim 2, wherein a stiffener is provided at the middle part of the leaf spring; and one end of the compression spring comes into contact with said stiffener.

5. Constant pressure micrometer according to claim 1 and further comprising adjustable stop means to limit the displacement of said anvil in a direction away from said spindle.

* * * * *